United States Patent
Medlin, Jr.

(10) Patent No.: US 6,484,979 B1
(45) Date of Patent: Nov. 26, 2002

(54) ADJUSTABLE ELECTRICAL BOX SUPPORT

(76) Inventor: Lewis B. Medlin, Jr., P.O. Box 455, Vinton, VA (US) 24179

( * ) Notice: Subject to any disclaimer, the term of this patent is extended or adjusted under 35 U.S.C. 154(b) by 9 days.

(21) Appl. No.: 09/621,149

(22) Filed: Jul. 21, 2000

(51) Int. Cl.$^7$ ............................................. A47G 1/17
(52) U.S. Cl. ................. 248/205.1; 250/3.7; 250/3.9; 248/906; 248/909
(58) Field of Search ...................... 248/205.1, 57, 248/906, 909; 220/3.7, 3.9

(56) References Cited

U.S. PATENT DOCUMENTS

| | | |
|---|---|---|
| 1,506,330 A | 8/1924 | Vandy |
| 1,789,124 A | 1/1931 | Wever |
| 1,800,813 A | 4/1931 | Banfield |
| 2,233,334 A | 2/1941 | Austin, Jr. ............... 248/57 |
| 2,316,389 A * | 4/1943 | Atkinson ............ 248/906 X |
| 2,788,188 A | 4/1957 | Smith et al. ............ 248/57 |
| 2,809,002 A | 10/1957 | Rudolph ............. 248/205.1 |
| 3,214,126 A * | 10/1965 | Roos ...................... 248/906 |
| 4,399,922 A | 8/1983 | Horsley ................. 220/3.6 |
| 4,483,453 A | 11/1984 | Smolik ................. 220/3.5 |
| 4,673,235 A | 6/1987 | Conley ................. 439/536 |
| 4,967,990 A | 11/1990 | Rinderer ............ 248/205.1 |
| 5,209,444 A | 5/1993 | Rinderer ............ 248/205.1 |
| 5,386,959 A | 2/1995 | Laughlin et al. ...... 248/205.1 |
| 5,405,111 A | 4/1995 | Medlin, Jr. ......... 248/205.1 |

* cited by examiner

Primary Examiner—Ramon O. Ramirez
(74) Attorney, Agent, or Firm—Olive & Olive, P.A.

(57) ABSTRACT

An electrical box support is provided having a set of struts telescoping one within the other to accommodate the length for attachment to studs of different spacings. Each strut has a face suited for mounting an electrical box and has a series of inwardly directed, uniformly and relatively closely spaced detents. The detents serve both for releasably locking the length of the support and for guiding the entry of screws used to attach the box to the support. Each strut has an end tab adapted for bending to mount to the studs in a position established so that a mounted electrical box appropriately meets the surface of a wall board to be installed. Bending in a controlled straight line is accomplished by the formation of discontinuous score lines.

A second embodiment of the invention is formed with two struts having end tabs and a third strut having no end tabs and engaging the other two struts. Either one or both of the struts with end tabs can be moved to change the length of the assembly. The assembly length is releasably locked by a series of mating detents.

23 Claims, 3 Drawing Sheets

ADJUSTABLE ELECTRICAL BOX SUPPORT

FIELD OF INVENTION

This invention relates to an electrical box support constructed of telescoping struts having means to releasably lock the struts and at an outer end of each strut a studengaging tab that can be bent to conform to different box depths.

BACKGROUND OF THE INVENTION

The terms "box" and "electrical box" as used herein are intended to refer to a junction box, receptacle box, switch box, terminal box, connector box or the like as are known in the electrical trade. The teachings of the patents described below are given for background and are deemed to be incorporated herein by reference.

U.S. Pat. No. 1,506,330 issued in 1924 recognized the need for an electrical box support capable of accommodating an electrical box of a known depth and studs of different spacing. The '330 patent teaches the practice of forming an electrical box support from a pair of telescoping, channel formed struts, each having a face to which the box could be attached. The '330 patent also teaches bending the ends of the support to form right angled tabs for mounting the box support to and between adjacent studs. The '330 patent box support however required that adjustments for boxes of different depths be made by locating the bent ends of the box support at different locations on the sides of the studs.

U.S. Pat. No. 1,789,124 issued in 1931 also recognized the need for adjusting the length of an electrical box support by bending the ends of the support to accommodate to studs of different spacing.

U.S. Pat. No. 2,233,334 issued in 1941 also recognized the need for an electrical box support capable of accommodating electrical boxes of different depth and mounting to studs of different spacing. The '334 patent teaches the practice of forming an electrical box support from a single bar having a face to which the box could be attached. The '334 patent also teaches bending the ends of the support to form right angled tabs for mounting the box support between and to adjacent studs. The electrical box support of the '334 patent however was not adjustable lengthwise and also required that adjustments for boxes of different depths be made by locating the bent ends of the box support at different locations on the sides of the studs.

U.S. Pat. No. 2,788,188 issued in 1957 illustrates in one embodiment an electrical box support constructed of a pair of struts which telescope within each other so as to be able to adjust to different spacings between the studs and providing a face to which the box could be attached. In the mentioned embodiment, the '188 patent also illustrates the practice of prebending the ends of the telescoping struts to form tabs useful for attaching the box support to and between adjacent studs. In another embodiment, the '188 patent illustrates an electrical box support formed from a single flat sheet with bendable tabs at each end each having a plurality of grooved, embossed or etched lines at different locations along which each tab can be bent in the field to form a flange at right angles to the plane of the sheet. Thus, the '188 patent can also be construed to teach the practice of being able to form an electrical box support either with prebent tabs or with flat tabs adapted to be bent in the field.

With regard to the practice of providing lines of weakened metal, bend points, a line of holes or the like in an electrical box support, to facilitate bending or breaking of the metal along a particular line, reference is also made to U.S. Pat. No. 4,399,922, issued in 1983, for an electrical outlet box support. The '922 patent illustrates a pair of weakening lines used to facilitate bending of a portion of the support; U.S. Pat. No. 4,483,453, issued in 1984, also illustrates an electrical box support in which a plurality of parallel lines of holes are used to facilitate breaking of excess metal; and U.S. Pat. No. 4,673,235, issued in 1987, also describes an electrical receptacle subplate having two pairs of such bend lines.

U.S. Pat. No. 1,800,813, issued in 1931, illustrates use of a lengthwise V-groove in the strut of an electrical box support and of a series of preformed holes to facilitate insertion of nails, screws or the like. U.S. Pat. No. 4,967,990, issued in 1990, recognizes use of pilot holes to facilitate the starting and use of metal screws for securing the box to a face on one of the telescoping struts. The electrical box support described in the '990 patent comprises a pair of telescoping struts adapted to be mounted between two spaced-apart wall studs. Each strut comprises an elongate web of sheet metal forming a front face of the strut, a pair of side walls extending rearwardly from the side edges of the web, and a channel formed inwardly of the web running substantially the full length of the web between the side edges of the web. Inwardly turned flanges connect to the side walls and define the bottom of the channel. Pilot holes are spaced along the web at relatively closely spaced and regular intervals whereby an electrical box may be attached to the strut in a selected position lengthwise of the strut by placing the back wall of the box flush against the front face of the web over the channel and then fastening the box to the strut by using screws threaded through selected pilot holes.

Applicant's prior U.S. Pat. No. 5,405,111, issued in 1995 for a Bracket For Anchoring Apparatus Between Wall Studs, also illustrates a feature of interest to the present invention, namely, the use and advantage of detents. As disclosed in the '111 patent, detents are used rather than holes to facilitate installation of self drilling sheet metal screws for attaching apparatus to the bracket. So far as applicant is aware, the '111 patent is the only known prior art reference which illustrates the use and advantage of detents in an electrical box support though it has been known to use a series of holes to facilitate insertion of nails, screws and the like as seen for example in the aforementioned U.S. Pat. No. 1,800,813, issued in 1931 and U.S. Pat. No. 4,967,990, issued in 1990.

With the above as background, it is to be noted that use of the telescoping type electrical box support has introduced a problem in that the known struts which telescope one within the another often come loose before being installed because of the typical free-sliding fit between the telescoping struts of the support. Thus, if an installer, for example, is on a ladder and is in the process of installing a telescoping type electrical box support of conventional construction, the typical telescoping struts particularly when held vertically because of their relatively loose sliding fit are apt to separate and permit one of the struts to fall, thus risking harm to both people and objects below.

With regard to the need for establishing a relatively tight fit between struts of a telescoping type electrical box support, U.S. Pat. No. 2,788,188, issued in 1957 describes a telescoping type electrical box support but specifically refers to the sections of the support being "relatively slidable." U.S. Pat. No. 2,809,002, issued in 1957, refers to the relation between two struts forming a telescoping type electrical box support as permitting "relatively free-sliding movement." U.S. Pat. No. 5,386,959, issued in 1995, describes a telescoping type electrical box support in which mention is made of the two sections of the support "not being readily separable". The '959 patent however does not show nor do any of the other mentioned patents show, any kind of releasable locking mechanism which would permit telescoping struts once assembled to be held vertically without separating and yet be readily adjustable lengthwise by manual pressure applied to the struts. In dealing with this same problem, B-Line Systems, Inc. has recently started marketing a telescoping type electrical box support formed with inner and outer sections and with pilot holes in each section such as shown in B-Line's Patent 5,209,444, issued in 1993, and a resilient finger (not shown in the '444 patent) formed intermediate the length of the outer section and having a protrusion which resiliently engages and slides on an opposite surface of the inner section apparently for the purpose of reducing any tendency of one section to slide on the other. However, the sections are never releasably locked as with the present invention.

The term "stud" as used herein is intended to include structural members in a building surface, including wall studs, joists, rafters, etc. The term "wall" as used herein is intended to include ceiling surfaces as well as vertical walls.

Therefore, the object of the invention is to provide a further improved telescoping type electrical box support which accommodates and can be field bent to accommodate boxes of different depths, can be adjusted to different stud spacings, and, of particular importance to the invention can while being installed, maintain a relatively tight but releasably locked engagement between the telescoping struts. Other objects will become apparent as the description proceeds.

SUMMARY OF THE INVENTION

The improved electrical box support of the invention comprises in a first embodiment at least two and in a second embodiment three struts that are assembled in telescoping relation to accommodate different stud spacings and also having means to accommodate different depths of electrical boxes. The box support assembly of the invention is formed of outer and inner struts with a series of interengaging detents, i.e. conical or hemispherical shaped depressions, so that the struts can be moved to relative positions in which the outer strut detents engage and nest into opposed inner strut detents to releasably lock the struts comprising the two-strut assembly together at some selected length. The outer strut can be manually moved relative to the inner strut to temporarily disengage the detents and change the releasably locked length of the box support assembly. One end of the outer strut and an opposed end of the inner strut are formed with a tab that is adapted to be bent for mounting to adjacent building studs at a depth appropriate to accommodate an electrical box to be mounted thereto.

DESCRIPTION OF THE PREFERRED EMBODIMENTS

Figure 1A:
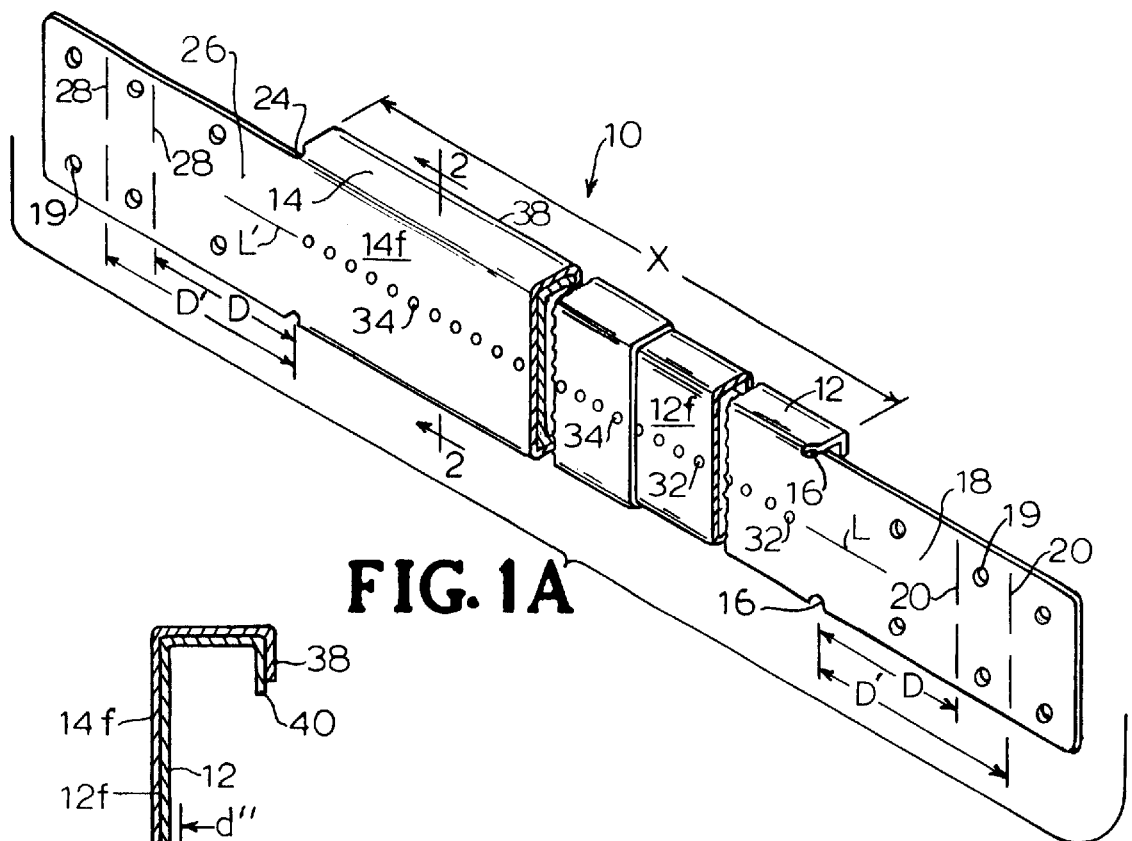
FIG. 1A is a perspective illustration of a first embodiment of the adjustable electrical box support of the invention made up of two releasably engaged struts and showing the front surfaces of the end tabs before the end tabs thereof have been bent in the field for attachment to adjacent wall studs and to accommodate to a particular depth of electrical box.

In accordance with the objects described above, and in reference to FIG. 1A, the adjustable electrical box support 10 is illustrated as comprising inner strut 12 and outer strut 14. Inner strut 12 and outer strut 14 are formed as elongate channels that are sized to telescopically nest. Inner strut 12 slidingly resides within outer strut 14 to allow a user to telescopically adjust the overall support length X shown in FIG. 1A. Struts 12 and 14 of support 10 are preferably formed with a channel-shaped cross section to provide stiffness and maintain secure engagement of the mating struts. Struts 12 and 14 are preferably formed of galvanized sheet steel, as is known in the electrical trade, of appropriate gauge and of channel dimensions to provide sufficiently stiff support for securely mounting one or more electrical boxes or other devices thereon. For example, 24 gauge (0.6 mm; 0.025 inch thick) sheet steel has been found to be a satisfactory material for the support of the invention.

Inner strut 12 terminates with tab 18 that essentially is an extension of web 12f. A pair of minimal notches or cuts 16 are formed on opposite edges of tab 18 at its juncture to the inner strut web 12f to provide stress relief during the cutting and bending operation. A pair of discontinuous score lines 20 are formed in the front surface of tab 18 substantially perpendicular to axis L of inner strut 12 and at selected distances D, D' from notches 16, leaving some additional length of tab 18 extending beyond. As used herein, a discontinuous score line is understood to be formed by a linear series of spaced apart indentations in the metal surface, e.g. dashes or points, and which tend to make the metal relatively thin where the indentations are made. That is the indentations only partially penetrate the thickness of the metal but are deep enough to facilitate bending of the metal along the score lines. For example, in FIG. 1A, when the strut is made of 24 gauge sheet steel and the tabs are 1¾ inches in width, the depicted score lines 28 can be ⅝ inch in length and approximately between 0.006–0.020 inches in depth.

Distance D is preferably determined to allow a standard 1½ inches (38 mm) deep electrical box, when mounted to support 10 and extending outwardly therefrom (see FIG. 5), to be flush with the inner surface of a wall subsequently assembled to the wall studs S and S'. Distance D' is located similarly for a standard electrical box that is 2⅛ inches (54 mm) deep. In other words, distance D or distance D' is substantially equal to the depth of the electrical box being mounted.

Outer strut 14 has tab 26 with notches 24, similar to the previously described notches 16, and discontinuous score lines 28 to bend tab 26 in right angular relation as described above in relation to tab 18 of inner strut 12. A further discontinuous score line (not shown) is formed on the back surface of tab 26.

Figure 1B:
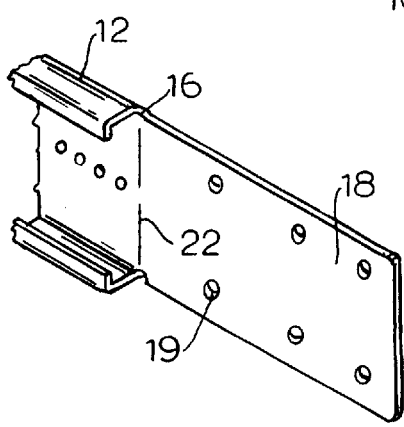
FIG. 1B is a perspective illustration of the rear surface of one end tab of the preferred embodiment before it has been bent to accommodate to a particular depth of electrical box.

FIG. 1B shows a discontinuous score line 22 formed on the back surface of tab 18 and substantially aligned with notches 16. Positioning discontinuous score line lines 20 on one surface of tab 18 and discontinuous score lines 22 on an opposite surface of tab 18 recognizes that tab 18 is intended to be bent in a direction to open score lines 20, 22 for optimum control of bending for straightness, position, and orientation normal to the length of strut 12. It has been discovered that a discontinuous score line made up of a linear series of spaced apart indentations of appropriate depth and length, while providing for a controlled bend in a selected location retains a substantial portion of the metal's resiliency to withstand multiple bend cycles without fracture. The depth and length of the segments of the score lines are thus chosen with this object in mind.

Figure 2A:
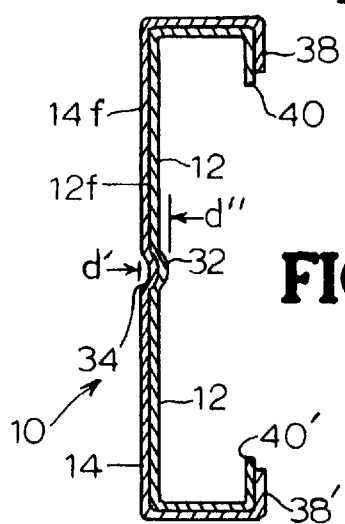
FIG. 2A is a cross sectional view of the adjustable electrical box support of the invention as shown in FIG. 1A and as taken along line 2—2 of FIG. 1A and with the detents engaged.
Figure 2B:
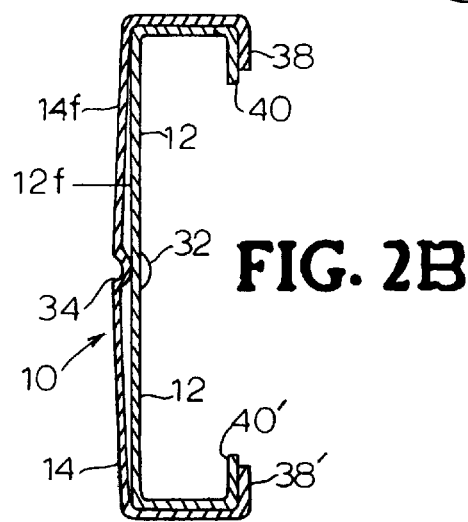
FIG. 2B is a cross sectional view of the adjustable electrical box support of the invention as shown in FIG. 2A but with the struts moved to cause the detents to be disengaged.

As discussed above, while the principle of providing an adjustable length electrical box support has previously been recognized, the prior art adjustable components, with the exception of the previously discussed B-Line support having a frictionally engaged finger, are relatively loosely fitted together, and can readily fall apart particularly after being assembled and when held in a vertical position. None of the known prior art struts can be releasably locked together. By contrast, in the support made according to the invention, the telescoping members of support 10 are releasably locked in relation to each other at some desired overall length X. Length X of support 10, once selected, is releasably locked by a series of detents 32 that are formed in web 12f of inner strut 12 and that can be moved to engage detents 34 that are formed in web 14f of outer strut 14 to releasably lock struts 12 and 14 as depicted in FIG. 2A. Alternatively, struts 12 and 14 can be moved to disengage detents 32 from detents 34 as illustrated in FIG. 2B. Detents 32 are formed as depressions in web 12f of inner strut 12 and effectively appear as dimples. Detents 32 may be round, square, or oval in cross section, for example, resulting in a hemispherical, rounded pyramid, or elliposid-shaped indentation. In the preferred embodiment, detents 32 are substantially hemispherical. Detents 32 are formed on inner strut 12 along a substantially straight, centrally located, axis L that is substantially parallel to the length of inner strut 12.

The series of detents 34 are formed on web 14f of outer strut 14 in the manner described above with reference to detents 32 and reside along a central axis L' which resides parallel to axis L of inner strut 12 when inner and outer struts 12 and 14 are assembled in sliding and releasably locked relation to each other as for example in FIG. 1A. Detents 32 of inner strut 12 are preferably made slightly larger in diameter and depth than detents 34 of outer strut 14, to nest snugly together. Detents 32, 34 are positioned equidistant from each other along inner and outer struts 12 and 14 so that multiple detents when in the releasably locked position of FIG. 2A nest simultaneously to obtain maximum engagement and security in maintaining the selected length X of support 10. However, when length adjustments are necessary, the detents can be disengaged as in FIG. 2B and the struts moved in the appropriate direction during which detents 34 of strut 14 slide on the surface 12(f) of strut 12. As will be understood by those skilled in the art, detents 32 and 34 are fundamentally a linear series of protrusions formed on a surface of a first strut that are oriented to nest into a mating linear series of depressions in a second strut when the first and second struts are releasably locked together.

In the interest of improving the efficiency of field installation, end tabs 18, 26 may be preformed (not shown) at a right angle to the length of electrical box support 10 at the factory and shipped in this form. When this is done, the installer only has to make a single bend at each end, cutting the required number of bends for this field-bending operation in half.

Referring now to FIGS. 2A and 2B, the releasable engagement and disengagement of inner strut 12 and outer strut 14 is illustrated, especially with respect to detents 32 and 34. The channel shape of struts 12 and 14, when assembled into a telescoping bar, has outer rims 38, 38' on strut 14 that wrap substantially around inner rims 40, 40' on strut 12 to keep the two channels engaged. When so engaged as in FIG. 2A, outer detent 34, formed in outer strut 14 is pressed into inner detent 32 of inner strut 12. Outer detent 34 is formed with depth d', as measured from the front face of web 14f to the bottom apex of detent 34. Inner detent 32 has a depth d'', as measured from the back surface of web 12f to the bottom apex of detent 32. Inner detent 32 and outer detent 34 are preferably formed with the radius and depth of outer detent 34 being incrementally less than the depth of inner detent 32 to facilitate nesting together. Rims 38, 40, 38', and 40' keep struts 12 and 14 from separating and keep detents 32 and 34 in firm contact. When so engaged, detents 32 and 34 securely maintain the relative positions of struts 12 and 14 and hold the selected length X (see FIG. 1A) of electrical box support 10. Length X is adjusted to equal the distance between two adjacent wall studs in a wall construction of a building, e.g. 36.8 cm (14.5 inches). When it is necessary to extend or compress the working length X of electrical box support 10, the user pulls apart or pushes together outer strut 14 and inner strut 12 which causes each outer strut detent 34 to move out of the corresponding inner strut detent 32 as in FIG. 2B and slide over the planar portion 12f of inner strut 12 between adjacent detents 32 and settle into the next inner strut detent 32 once other detents 32, 34 become aligned and when the desired length X has been obtained.

It should of course be understood that the struts 12 and 14 are formed to permit a snug sliding fit when the detents are disengaged so as to permit the surfaces 14f and 12f to slightly bend to permit the detents 34 to slide on surface 12f when being moved.

Figure 3:
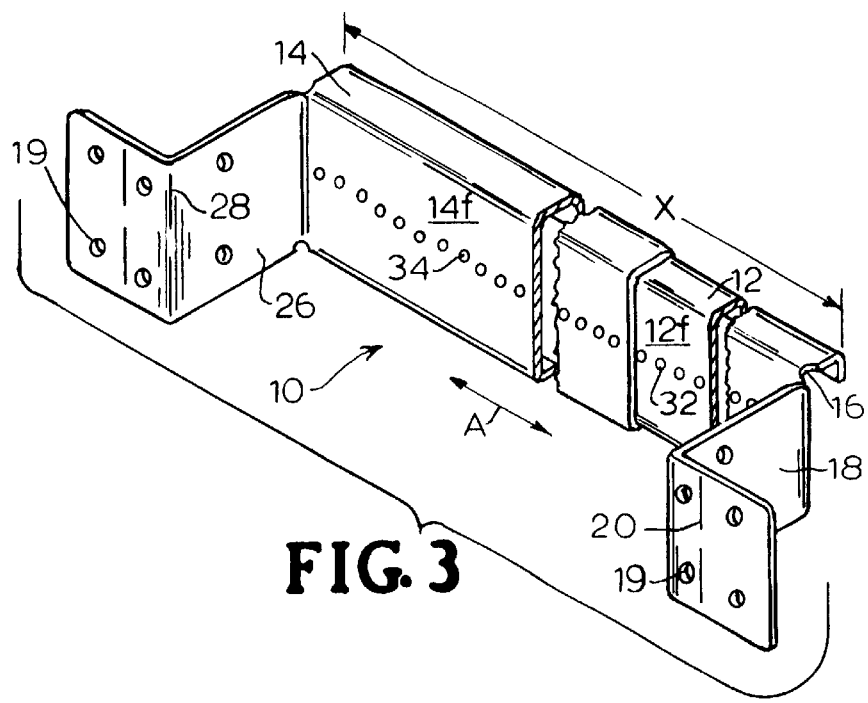
FIG. 3 is a perspective illustration of the adjustable electrical box support of the invention as shown in FIG. 1A after the end tabs thereof have been bent to accommodate to a particular depth of box and in a form suitable to being attached to a pair of spaced apart wall studs.

FIG. 3 shows support 10 after tab 18 and tab 26 have each been bent to form a pair of sequential right angles for installation between a pair of adjacent studs. Tab 18, by way of example, is bent at score line 22 (FIG. 1B) in a first bend direction and at one of score lines 20 in a second bend direction. After bending tabs 18 and 26, the assembled inner strut 12 and outer strut 14 are telescoped to adjust length X of support 10 in the direction shown by arrow A to fit the stud separation distance required. Because of the snug nesting of inner strut 12 in outer strut 14, if the distance between a pair of adjacent wall studs were such that detents 32 and 34 did not engage one another, the pressure and frictional engagement of outer detents 34 against web 12f would, nonetheless, prevent unwanted sliding. In this manner, struts 12 and 14 would not tend to separate accidentally and particularly when held vertically by the installer of the support.

Figure 4:
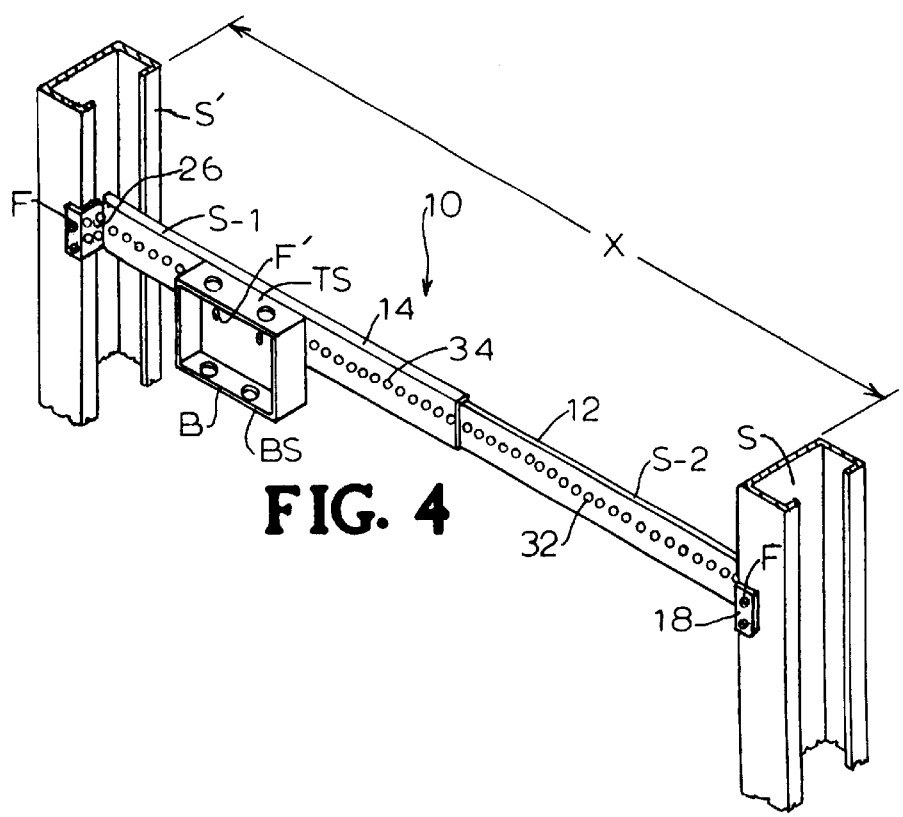
FIG. 4 is a perspective illustration of the adjustable electrical box support of the invention as shown in FIG. 1A after being attached to a pair of adjacent wall studs with an electrical box of a particular depth mounted thereto.

Referring now to FIG. 4, electrical box support 10 is shown after it has been adjusted in length and fixedly attached to adjacent studs S and S' with detents 32 and 34 releasably locking the support length X during attachment. As noted above, length X of support 10, when assembled, is substantially equal to the spacing between adjacent studs S, S'. Tabs 18 and 26 may be pre-punched with holes 19 to accept fasteners (as illustrated in FIGS. 1A and 3) or the needed holes may be formed during installation. Fasteners F for attaching electrical box support 10 to studs S and S' may be of any convenient type, e.g. self-drilling sheet-metal screws. Fasteners F may be installed into the front or side face of studs S and S'. Next, electrical box B is mounted to support 10 in a selected position therealong. Since the holes formed in standard electrical boxes are spaced from one another at known distances, by forming detents 32 and 34 at appropriate intervals, the fasteners passed through the box holes will find the detents. An interval between adjacent detents that is appropriate to match the holes in commercial electrical boxes is 6 mm (¼ inch). A plurality of fasteners F' are inserted through appropriate holes that are pre-formed in the base plate of electrical box B to nest respectively into detents 32 or 34. As will be understood, the alignment of the holes in electrical box B with detents 34 assures that electrical box B will be mounted with its top and bottom surfaces TS and BS (FIG. 4) parallel to surfaces S-1 and S-2 of electrical box support 10. According to the teaching in applicant's prior U.S. Pat. No. 5,405,111, engagement of screw fasteners through a formed detent improves the connective security.

Figure 5:
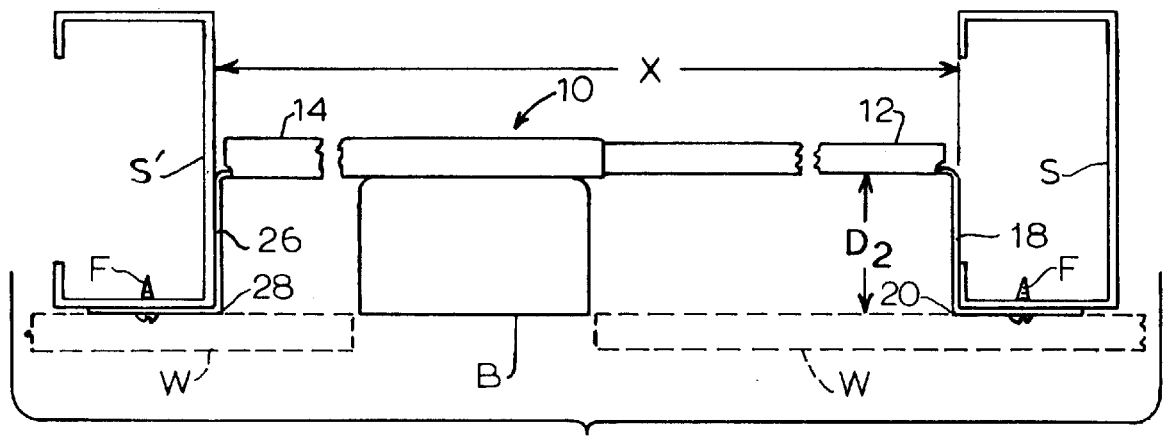
FIG. 5 is a top plan view of the adjustable electrical box support of the invention as shown in FIG. 4 mounted to a pair of adjacent wall studs and with an electrical box of particular depth mounted and with a sheetrock wall shown in dashed lines.

FIG. 5 is a plan view of the adjustable electrical box support 10 of the invention, with end tab 18 and end tab 26 bent to engage adjacent wall studs S and S'. The length X of support 10 is adjusted to fill the space between studs S and S', with tabs 18 and 26 bent respectively at discontinuous score lines 20 and 28. In this configuration, support 10 mounts to studs S and S' at a depth $D_2$ so that the outer edge of electrical box B will be substantially flush with an inner surface of a wall board W (shown in dashed lines) when mounted thereto.

Figure 6:
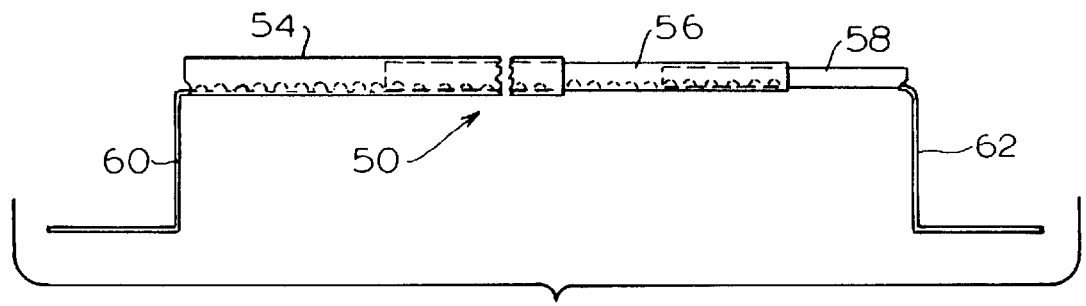
FIG. 6 is a top plan view of a second embodiment of the adjustable electrical box support of the invention made up of three releasably locking struts and showing the end tabs thereof bent prior to being shipped.

FIG. 6 illustrates a further embodiment of the present invention in which electrical box support 50 comprises an assembly having three telescoping channel-shaped components, outer strut 54, middle strut 56, and inner strut 58. Inner strut 58 fits slidingly within middle strut 56 which fits slidingly within outer strut 54. Middle strut 56 is a channel without end tabs and with a series of detents along substantially its entire length and formed in the manner previously explained. Outer strut 54 has end tab 60, and inner strut 58 has end tab 62. This further embodiment functions similarly to the embodiment shown in FIGS. 1–5 and permits a greater range of length adjustability. For example, with two struts (according to the first preferred embodiment) of 25 cm (12 inches) length each, the overall span could be adjusted from a minimum of 25 cm (12 inches) to a maximum of 45 cm (17.7 inches); with three 25 cm (12 inches) long struts, an overall span of from 25 cm (12 inches) to 65 cm (25.6 inches) is possible. It is further recognized that with three struts slideably engaged, it is not possible to predict where the middle strut resides. Thus, in order to prevent middle strut 56 from becoming disengaged from one of the outer struts 54 or 58, a stop (not shown) is provided in the nested channels to prevent this from happening.

The above detailed description of a preferred embodiment of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to lie within the scope and spirit of the invention as set forth in the following claims.

What is claimed is:

1. An adjustable electrical box support comprising first and second elongate members telescopically assembled to one another and constructed of flat facing surfaces in sufficiently tight engagement to prevent said members after being telescopically assembled from separating when the assembled members are held vertically, said first member being formed with a linear series of protrusions and said second member being formed with a linear series of depressions, said protrusions and depressions being spaced apart and located on respective flat facing surfaces of said first and second members in a manner such that when said support is at a selected length, selected said protrusions may engage selected said depressions to manually releasably lock said members together at said selected length and when not at a said selected length said members are enabled to bend sufficiently to permit said protrusions to slide on the flat facing surface on which said depressions are formed while maintaining said members in said sufficiently tight engagement.

2. An adjustable electrical box support, comprising:
   (a) a first elongate member having an end tab adapted for being attached to a first stud in a building wall;
   (d) a second elongate member having an end tab adapted for being attached to a second stud that is substantially parallel to and spaced apart from said first stud in said building wall with said second elongate member telescopically assembled to said first member so as to establish said support with a selected length substantially equal to the spacing between said studs;
   (c) plural cooperating locking means formed at a linear spaced series of locking positions on each of said members and adapted when moved linearly in conjunction with manual adjustment of the telescoping relation of said members to bring the locking means of the first member in releasable engagement with the locking means of the second member at a selected cooperative locking position whereby to establish and maintain said support in a manually releasable said selected length;
   (d) wherein said plural cooperating locking means comprises a series of interengageable detents formed along a lengthwise extending axis of each of said elongate members; and
   (e) wherein said detents are spaced apart from each other along said axis of each of said members by a distance selected such that individual fasteners passed through mounting holes in a base plate of an electrical box mounted on said supported are able to each engage a detent which is in turn engaged with another.

3. An adjustable electrical box support as described in claim 2, wherein each said tab is controllably bendable to accommodate the depth of an electrical box.

4. An adjustable electrical box support as described in claim 2, wherein said members are formed of sheet metal.

5. An adjustable electrical box support as described in claim 2, wherein the detents formed on said first elongate member are deeper than the detents formed on said second elongate member.

6. An adjustable electrical box support as described in claim 2, wherein said members are formed of sheet metal and each said tab includes discontinuous score lines each of which comprises a linear series of spaced apart indentations along the length of which said metal is made sufficiently thin to facilitate field bending of each tab along said score lines.

7. An adjustable electrical box support comprising first and second elongate members telescopically assembled to one another, said first member being formed with a linear series of evenly spaced apart protrusions and said second member being formed with a linear series of evenly spaced apart depressions, said protrusions and depressions being located on the respective said first and second members along the respective central axis thereof and in a manner such that when said support is at a selected length, selected said protrusions engage selected said depressions to manually releasably lock said members together at said selected length and said protrusions and depressions being spaced apart from each other along the respective central axis of said members by a distance such that when so engaged permit individual fasteners to be passed through both the mounting holes of an electrical box mounted on said support and engaged protrusions and depressions located so as to be substantially in alignment with said mounting holes.

8. An adjustable electrical box support, comprising:
   (a) a first elongate member having an end tab adapted for being attached to a first stud in a building wall;
   (b) a second elongate member having an end tab adapted for being attached to a second stud that is substantially parallel to and spaced apart from said first stud in said building wall with said second elongate member telescopically assembled to said first member so as to establish said support with a selected length substantially equal to the spacing between said studs;
   (c) each said tab includes a solid metal portion bearing one or more discontinuous score lines each of which is formed for its entire length in a said solid metal portion and comprises a linear series of spaced apart indentations to facilitate field bending of each tab along said score lines;
   (d) linearly aligned and evenly spaced apart manually adjustable cooperating means formed on each of said members for manually releasably locking said members to each other so as to be able to establish and maintain a selected length of said electrical box support;
   (e) said cooperating locking means comprising a series of interengageable detents formed along a lengthwise extending axis of each of said elongate members; and
   (f) said detents being spaced apart from each other along said axis of each of said members by a distance selected such that individual fasteners passed through mounting holes in a base plate of an electrical box mounted on said support are able to each engage a detent which is in turn engaged with another.

9. An adjustable electrical box support, comprising:
   (a) a first elongate member having an end tab adapted for being attached to a first stud in a building wall;
   (b) a second elongate member having an end tab adapted for being attached to a second stud that is substantially parallel to and spaced apart from said first stud in said building wall with said second elongate member telescopically assembled to said first member so as to establish said support with a selected length substantially equal to the spacing between said studs;
   (c) each said tab includes one or more discontinuous score lines each of which comprises a linear series of spaced apart indentations to facilitate field bending of each tab along said score lines;
   (d) cooperating means formed on each of said members for manually releasably locking said members to each other so as to be able to establish and maintain a selected length of said electrical box support; and
   (e) wherein said cooperating means for manually releasably locking said members to each other comprises a series of interengageable detents formed along a lengthwise extending axis of each of said elongate members; and
   (f) wherein said detents are spaced apart from each other along said axis of each of said members by a distance selected such that individual fasteners passed through mounting holes in a base plate of an electrical box mounted on said support are able to each engage a detent which is in turn engaged with another.

10. An adjustable electrical box support, comprising:
    (a) a first elongate member having an end tab adapted for being attached to a first stud in a building wall;
    (b) a second elongate member telescopically assembled at a first end to said first member;
    (c) a third elongate member having an end tab adapted for being attached to a second stud that is substantially parallel to and spaced apart from said first stud in said building wall and telescopically assembled to said second member at a second end thereof;
    (d) cooperating means formed on each of said members for manually releasably locking said members to each other so as to be able to establish and maintain a selected length of said electrical box support;
    (e) wherein said cooperating means for manually releasably locking said members to each other comprises a series of interengageable detents formed along a lengthwise extending axis of each of said elongate members; and
    (f) wherein said detents are spaced apart from each other along said axis of each of said members by a distance selected such that individual fasteners passed through mounting holes in a base plate of an electrical box mounted on said support are able to each engage a detent which is in turn engaged with another.

11. An adjustable electrical box support as described in claim 10, wherein said detents formed on said middle elongate member are deeper than the detents formed on said first and second elongate members.

12. An adjustable electrical box support as described in claim 10, wherein said members are formed of sheet metal.

13. An adjustable electrical box support as described in claim 10, wherein said members are formed of sheet metal and each said tab includes discontinuous score lines each of which comprises a linear series of spaced apart indentations along the length of which said metal is made sufficiently thin to facilitate field bending of each tab along said score lines.

14. An adjustable electrical box support, comprising:
    (a) a first elongate member having an end tab adapted for being attached to a first stud in a building wall;
    (b) a second elongate member having an end tab adapted for being attached to a second stud that is substantially parallel to and spaced apart from said first stud in said building wall with said second elongate member telescopically assembled to said first member so as to establish said support with a selected length substantially equal to the spacing between said studs;
    (c) plural cooperating locking means formed in a linear evenly spaced apart series of locking positions on each of said members and adapted when moved linearly in conjunction with manual adjustment of the telescoping relation of said members to bring the locking means at the evenly spaced apart positions on the first member in releasable engagement with the locking means at the evenly spaced apart positions on the second member at a selected cooperative locking position whereby to establish and maintain said support in a manually releasable said selected length;

(d) said plural cooperating locking means comprising a series of interengageable detents formed along a lengthwise extending axis of each of said elongate members; and (e) said detents being spaced apart from each other along said axis of each of said members by a distance selected such that individual fasteners passed through mounting holes in a base plate of an electrical box mounted on said support are able to each engage a detent which is in turn engaged with another.

15. An adjustable electrical box support as described in claim 14, wherein said members are formed of sheet metal and each said tab includes discontinuous score lines each of which comprises a linear series of spaced apart indentations along the length of which said metal is made sufficiently thin to facilitate field bending of each tab along said score lines.

16. An adjustable electrical box support as described in claim 14, wherein each said tab is controllably bendable to accommodate the depth of an electrical box.

17. An adjustable electrical box support as described in claim 14, wherein said members are formed of sheet metal.

18. An adjustable electrical box support as described in claim 14, wherein the detents formed on said first elongate member are deeper than the detents formed on said second elongate member.

19. An adjustable electrical box support, comprising:

(a) a first elongate member having an end tab adapted for being attached to a first stud in a building wall;

(b) a second elongate member telescopically assembled at a first end to said first member;

(c) a third elongate member having an end tab adapted for being attached to a second stud that is substantially parallel to and spaced apart from said first stud in said building wall and telescopically assembled to said second member at a second end thereof;

(d) linearly aligned and evenly spaced apart manually adjustable cooperating means formed on each of said members for manually releasably locking said members to each other so as to be able to establish and maintain a selected length of said electrical box support;

(e) said cooperating means for manually releasably locking and unlocking said members comprising a series of interengageable detents formed along a lengthwise extending axis of each of said elongate members; and (f) said detents being spaced apart from each other along said axis of each of said members by a distance selected such that individual fasteners passed through mounting holes in a base plate of an electrical box mounted on said support are able to each engage a detent which is in turn engaged with another.

20. An adjustable electrical box support as described in claim 19, wherein said members are formed of sheet metal.

21. An adjustable electrical box support as described in claim 19, wherein said members are formed of sheet metal and each said tab includes discontinuous score lines each of which comprises a linear series of spaced apart indentations along the length of which said metal is made sufficiently thin to facilitate field bending of each tab along said score lines.

22. An adjustable electrical box support as described in claim 19, wherein said detents formed on said middle elongate member are deeper than the detents formed on said first and second elongate members.

23. An adjustable electrical box support, comprising:

(a) a first elongate member having an end tab adapted for being attached to a first stud in a building wall;

(b) a second elongate member having an end tab adapted for being attached to a second stud that is substantially parallel to and spaced apart from said first stud in said building wall with said second elongate member telescopically assembled to said first member so as to establish said support with a selected length substantially equal to the spacing between said studs;

(c) each said tab including one or more discontinuous score lines each of which comprises a linear series of spaced apart indentations to facilitate field bending of each tab along said score lines;

(d) cooperating means formed on each of said members and adapted when said members are telescopically assembled to be positioned to bring said cooperating means in contact one with the other and if when said cooperating means are in such contact said telescoping assembly of members is vertically positioned said cooperating means is operative to act as a stop so as to prevent one of said members from separating from the other of said members in the absence of being forcibly pulled apart;

(e) said cooperating means comprising a series of interengageable detents formed along a lengthwise extending axis of each of said members; and (f) said detents being spaced apart from each other along said axis of each of said members by a distance selected such that individual fasteners passed through mounting holes in a base plate of an electrical box mounted on said support are able to each engage a detent which is in turn engaged with another.

* * * * *

UNITED STATES PATENT AND TRADEMARK OFFICE
CERTIFICATE OF CORRECTION

PATENT NO.    : 6,484,979 B1
DATED         : November 26, 2002
INVENTOR(S)   : Lewis B. Medlin, Jr.

It is certified that error appears in the above-identified patent and that said Letters Patent is hereby corrected as shown below:

<u>Column 8,</u>
Line 9, replace "flat facing" with -- facing --;
Line 29, replace "(d)" with -- (b) --;

<u>Column 9,</u>
Line 34, delete "for its entire length"; and
Line 34, delete "a"

Signed and Sealed this

First Day of April, 2003

JAMES E. ROGAN
*Director of the United States Patent and Trademark Office*